(12) United States Patent
Lee et al.

(10) Patent No.: US 9,390,684 B2
(45) Date of Patent: Jul. 12, 2016

(54) THREE-DIMENSIONAL IMAGE DISPLAY APPARATUS

(71) Applicants: SAMSUNG DISPLAY CO., LTD., Yongin, Gyeonggi-Do (KR); SAMSUNG ELECTRONICS CO., LTD., Suwon-si, Gyeonggi-do (KR)

(72) Inventors: Sung Woo Lee, Anyang-si (KR); Il-Joo Kim, Hwaseong-si (KR); Jae-Hyun Park, Seoul (KR); Dong-Ki Lee, Suwon-si (KR); Jeesu Park, Hwaseong-si (KR)

(73) Assignees: SAMSUNG DISPLAY CO., LTD., Yongin, Gyeonggi-Do (KR); SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 47 days.

(21) Appl. No.: 14/299,094

(22) Filed: Jun. 9, 2014

(65) Prior Publication Data

US 2015/0130781 A1    May 14, 2015

(30) Foreign Application Priority Data

Nov. 11, 2013    (KR) .................. 10-2013-0136419

(51) Int. Cl.
*H04N 13/04* (2006.01)
*G06T 15/00* (2011.01)
*G09G 5/18* (2006.01)
*G09G 3/36* (2006.01)
*G02B 27/22* (2006.01)
(Continued)

(52) U.S. Cl.
CPC ............. *G09G 5/18* (2013.01); *G02B 27/2214* (2013.01); *G02B 27/2264* (2013.01); *G09G 3/003* (2013.01); *G09G 3/2092* (2013.01); *G09G 3/3611* (2013.01); *G09G 3/3688* (2013.01); *H04N 13/042* (2013.01); *H04N 13/0409* (2013.01); *H04N 13/0438* (2013.01); *H04N 13/0452* (2013.01); *H04N 13/0454* (2013.01); *H04N 13/0497* (2013.01)

(58) Field of Classification Search
None
See application file for complete search history.

(56) References Cited

U.S. PATENT DOCUMENTS

| 7,978,151 | B2 * | 7/2011 | Taira | .................. | H04N 13/0434 |
| | | | | | 345/6 |
| 8,902,297 | B2 * | 12/2014 | Park | ....................... | G09G 3/003 |
| | | | | | 345/212 |
| 8,934,000 | B2 * | 1/2015 | Kane | .................. | H04N 13/0438 |
| | | | | | 348/51 |

(Continued)

FOREIGN PATENT DOCUMENTS

| JP | 2011-217173 | 10/2011 |
| KR | 1020110104701 | 9/2011 |

(Continued)

*Primary Examiner* — Dismery Mercedes
(74) *Attorney, Agent, or Firm* — F. Chau & Associates, LLC

(57) ABSTRACT

A three-dimensional image display apparatus includes a display panel configured to display an image and including gate lines, data lines, and pixels connected to the gate lines and the data lines, a data driver configured to drive the data lines, a gate driver configured to drive the gate lines, a lens panel configured to refract light of the image displayed by the display panel, a lens driver configured to drive the lens panel, a lens controller configured to control the lens driver, and a timing controller configured to control the data driver, the gate driver, and the lens driver in response to an image signal and a control signal. The lens controller and the timing controller are mounted on the same control board.

17 Claims, 5 Drawing Sheets

(51) Int. Cl.
*G09G 3/00* (2006.01)
*G09G 3/20* (2006.01)

(56) References Cited

U.S. PATENT DOCUMENTS

| | | | | |
|---|---|---|---|---|
| 8,982,117 | B2* | 3/2015 | Park | H04N 13/0404 |
| | | | | 345/419 |
| 9,137,523 | B2* | 9/2015 | Jun | G02B 27/2264 |
| 2006/0197716 | A1 | 9/2006 | Tanaka et al. | |
| 2008/0225219 | A1* | 9/2008 | Saito | G02F 1/1345 |
| | | | | 349/150 |
| 2009/0128474 | A1 | 5/2009 | Ijzerman | |
| 2010/0220083 | A1* | 9/2010 | Kim | G09G 3/003 |
| | | | | 345/211 |
| 2011/0032438 | A1 | 2/2011 | Yun et al. | |
| 2011/0273440 | A1* | 11/2011 | Park | G09G 3/003 |
| | | | | 345/419 |
| 2011/0310096 | A1 | 12/2011 | Kim et al. | |
| 2012/0154556 | A1* | 6/2012 | An | G02B 27/2214 |
| | | | | 348/51 |
| 2012/0249506 | A1* | 10/2012 | Jeong | G02F 1/13306 |
| | | | | 345/211 |
| 2012/0274628 | A1* | 11/2012 | Lim | G02B 27/26 |
| | | | | 345/419 |
| 2012/0314143 | A1* | 12/2012 | Shin | B32B 37/02 |
| | | | | 349/15 |
| 2013/0057575 | A1* | 3/2013 | An | H04N 13/047 |
| | | | | 345/619 |
| 2013/0076704 | A1 | 3/2013 | Song et al. | |
| 2013/0076864 | A1* | 3/2013 | Takahashi | G09G 3/003 |
| | | | | 348/46 |
| 2013/0222713 | A1* | 8/2013 | Park | G02B 27/2264 |
| | | | | 349/15 |
| 2013/0249896 | A1* | 9/2013 | Hamagishi | H04N 13/0404 |
| | | | | 345/419 |
| 2014/0139561 | A1* | 5/2014 | Lee | G09G 3/003 |
| | | | | 345/690 |
| 2014/0168390 | A1* | 6/2014 | Cho | H04N 13/0404 |
| | | | | 348/54 |

FOREIGN PATENT DOCUMENTS

| | | |
|---|---|---|
| KR | 1020130021073 | 3/2013 |
| KR | 1020130060637 | 6/2013 |

* cited by examiner

| Mode / Gamma | 2D | Autosteroscopic 3D | Stereoscopic 3D |
|---|---|---|---|
| 0 | | | |
| 1 | | | |
| ⋮ | ⋮ | ⋮ | ⋮ |
| 255 | | | |

THREE-DIMENSIONAL IMAGE DISPLAY APPARATUS

CROSS-REFERENCE TO RELATED APPLICATIONS

This application claims priority under 35 U.S.C. §119 to Korean Patent Application No. 10-2013-0136419 filed on Nov. 11, 2013, the disclosure of which is incorporated by reference herein in its entirety.

TECHNICAL FIELD

The present invention relates to a three-dimensional image display apparatus capable of displaying a three-dimensional image.

DISCUSSION OF THE RELATED ART

A three-dimensional (3D) image display apparatus provides a 3D image to a viewer using binocular parallax between the human eyes. Since the human eyes are spaced apart, images observed at different angles by two eyes of a viewer are transmitted to the human brain, where the images are mixed with each other and perceived as a 3D image.

3D image displays using binocular parallax are classified into two types: a stereoscopic 3D image display and an autostereoscopic 3D image display. The stereoscopic 3D image display may use an anaglyph method and a shutter glass method, and the autostereoscopic 3D image display may use a barrier method and a lenticular method. The lenticular method polarizes lights passing through left and right pixels using lenses to display a 3D image. The lenticular method increases brightness since most of the light is transmitted through the lenses.

In recent years, a 3D image display apparatus that may be operated in a two-dimensional (2D) mode or a 3D mode in accordance with the power source voltage has been developed. The lens panel of the lenticular type 3D image display apparatus transmits an image light provided from a display panel without changing the image light when no power source voltage is applied thereto. However, when the power source voltage is applied to the lens panel, liquid crystals in the lens panel are realigned and the lens panel serves as a convex or Fresnel lens. Accordingly, the image light from the display panel is refracted by the lens panel serving as a convex or Fresnel lens, and as a result, the refracted image light is recognized by the viewer as a 3D image.

A 3D image display apparatus that provides a 3D image to a viewer using the lens panel utilizes circuits to control the display panel and the lens panel.

SUMMARY

Exemplary embodiments of the present invention provide a 3D image display apparatus including a control board that controls a display panel and a lens panel.

According to an exemplary embodiment of the present invention, a three-dimensional image display apparatus includes a display panel configured to display an image and including a plurality of gate lines, a plurality of data lines, and a plurality of pixels, each being connected to a corresponding gate line of the gate lines and a corresponding data line of the data lines, a data driver configured to drive the data lines, a gate driver configured to drive the gate lines, a lens panel configured to refract light of the image displayed by the display panel, a lens driver configured to drive the lens panel, a lens controller configured to control the lens driver, and a timing controller configured to control the data driver, the gate driver, and the lens driver in response to an image signal and a control signal. The lens controller and the timing controller are mounted on a same control board.

In an exemplary embodiment, the timing controller is operated in one of a two-dimensional mode, a first three-dimensional mode, and a second three-dimensional mode different from the first three-dimensional mode, in response to the control signal.

In an exemplary embodiment, the timing controller applies a first control signal to the data driver and applies a second control signal to the gate driver.

In an exemplary embodiment, the timing controller applies a third control signal to the lens controller to cause the lens panel not to be driven during the two-dimensional mode and the second three-dimensional mode.

In an exemplary embodiment, the control board further includes a memory that stores a driving data used to drive the lens driver.

In an exemplary embodiment, the memory is an electrically erasable programmable read-only memory (EEPROM).

In an exemplary embodiment, the memory further stores a first gamma compensation value, a second gamma compensation value, and a third gamma compensation value.

In an exemplary embodiment, the timing controller compensates for the image signal using the first gamma compensation value during the two-dimensional mode, compensates for the image signal using the second gamma compensation value during the first three-dimensional mode, and compensates for the image signal using the third gamma compensation value during the second three-dimensional mode.

In an exemplary embodiment, the lens driver includes a plurality of driving integrated circuits that drive the lens panel.

In an exemplary embodiment, the display panel is a liquid crystal display panel.

In an exemplary embodiment, the lens panel is operated as a Fresnel lens.

According to an exemplary embodiment of the present invention, a control board for a three-dimensional image display apparatus includes a timing controller configured to operate in one of a two-dimensional mode, a first three-dimensional mode corresponding to an autostereoscopic three-dimensional display mode, and a second three-dimensional mode corresponding to a stereoscopic three-dimensional display mode, and a lens controller configured to control a lens driver of the three-dimensional image display apparatus. The lens driver is configured to drive a lens panel of the three-dimensional image display apparatus. The timing controller is configured to apply a mode control signal to the lens controller. The mode control signal causes the lens panel to be driven during the first three-dimensional mode, and not to be driven during the two-dimensional mode and the second three-dimensional mode.

According to exemplary embodiments of the present invention, the circuits that control the display panel and the circuits that control the lens panel are mounted on one control board. As a result, the size of the three-dimensional image display apparatus may be reduced.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

It will be understood that when an element or layer is referred to as being "on", "connected to" or "coupled to" another element or layer, it can be directly on, connected or coupled to the other element or layer or intervening elements or layers may be present.

It will be further understood that, although the terms "first", "second", etc. may be used herein to describe various elements, components, regions, layers and/or sections, these elements, components, regions, layers and/or sections should not be limited by these terms. A first element, component, region, layer or section discussed below could be termed a second element, component, region, layer or section without departing from the teachings of the present invention.

Spatially relative terms, such as "beneath", "below", "lower", "above", "upper", etc., may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Hereinafter, exemplary embodiments of the present invention will be described in detail with reference to the accompanying drawings.

Figure 1:
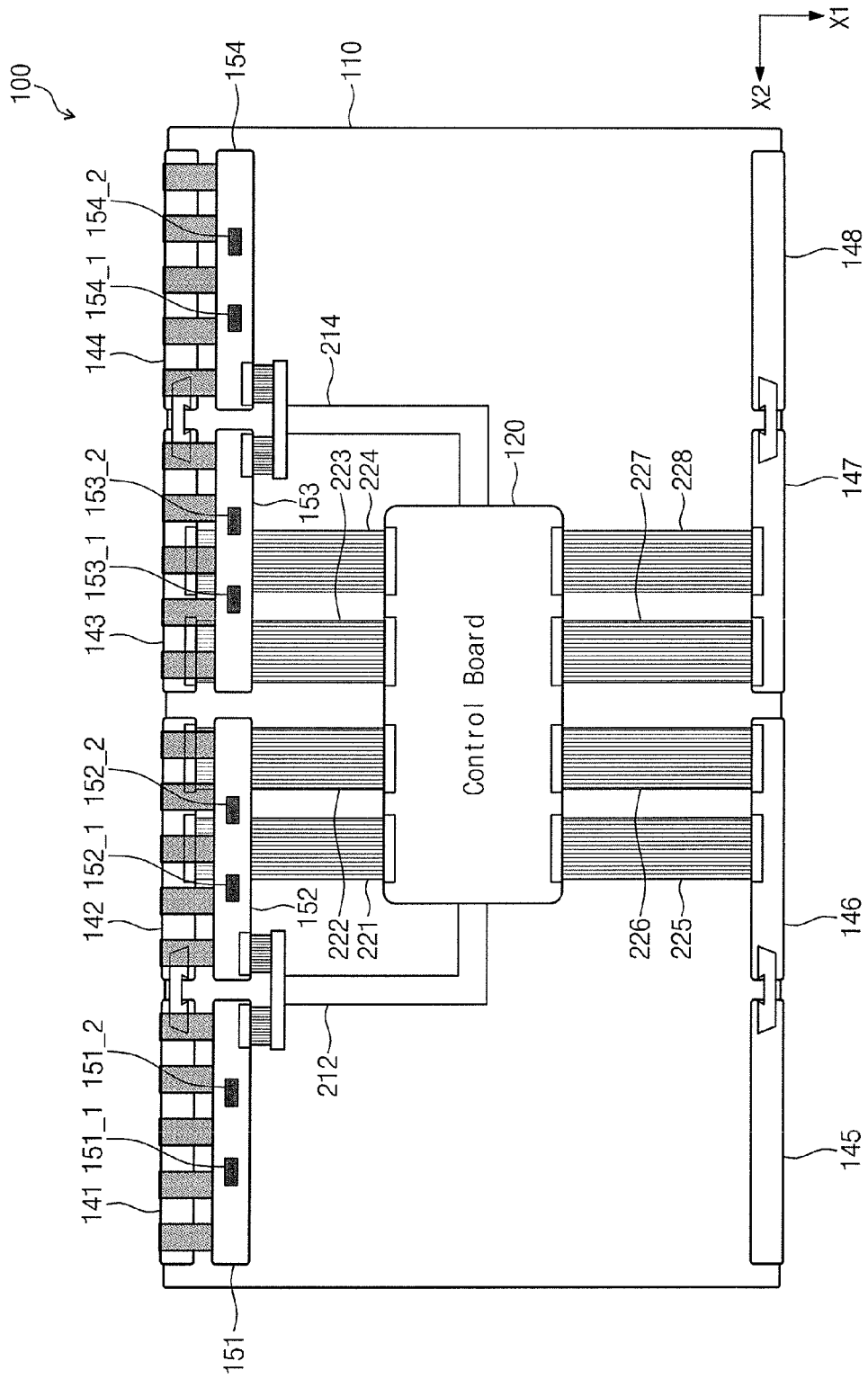
FIG. 1 is a plan view showing a rear portion of a three-dimensional (3D) image display apparatus according to an exemplary embodiment of the present invention.
Figure 2:
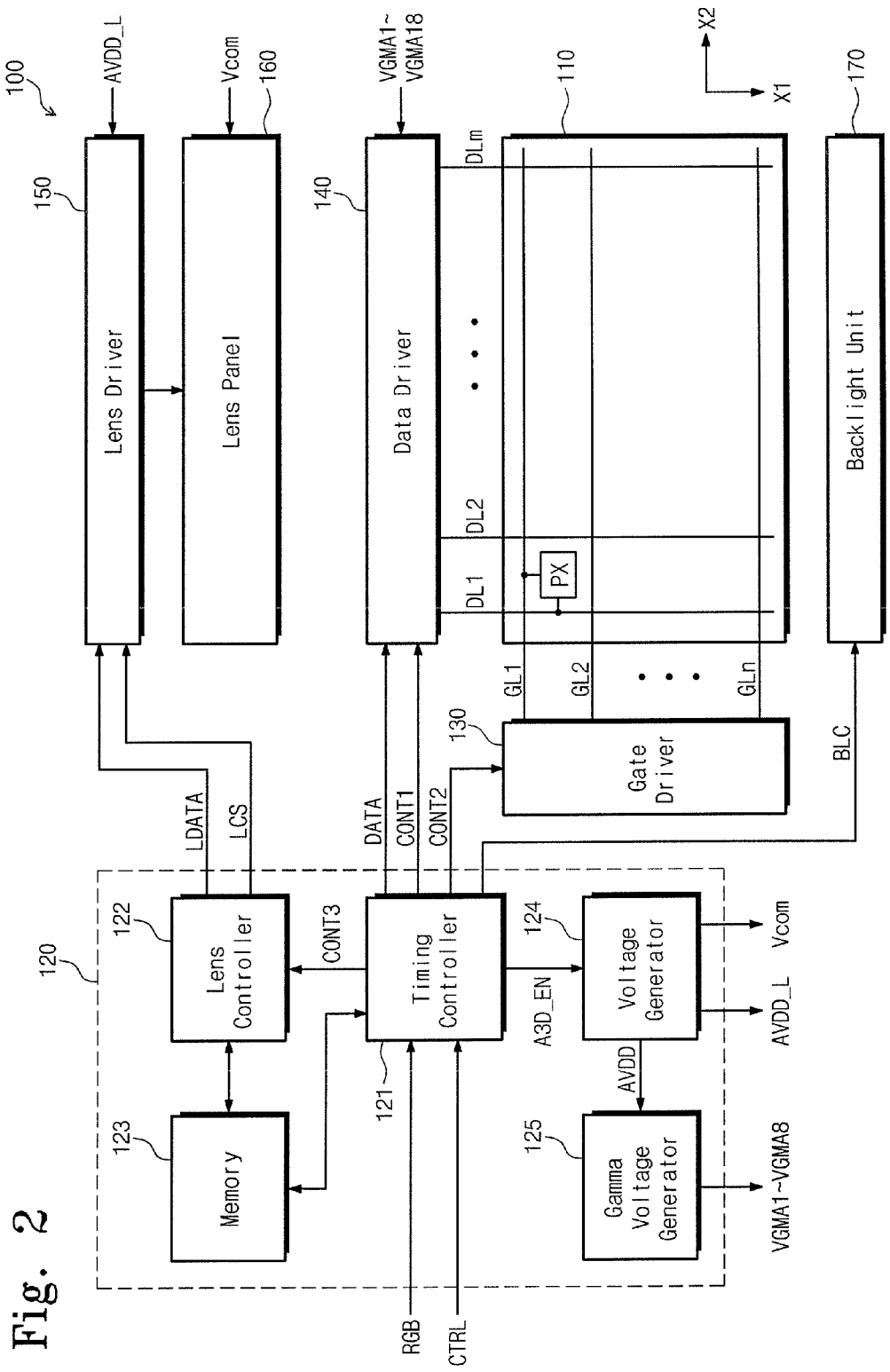
FIG. 2 is a block diagram showing the 3D image display apparatus shown in FIG. 1 according to an exemplary embodiment of the present invention.

FIG. 1 is a plan view showing a rear portion of a three-dimensional (3D) image display apparatus 100 according to an exemplary embodiment of the present invention. FIG. 2 is a block diagram showing the 3D image display apparatus 100 shown in FIG. 1 according to an exemplary embodiment of the present invention.

Referring to FIGS. 1 and 2, the 3D image display apparatus 100 includes a display panel 110, a control board 120, a gate driver 130, a data driver 140, a lens driver 150, a lens panel 160, and a backlight unit 170.

The display panel 110 includes a plurality of data lines DL1 to DLm extending in a first direction X1, a plurality of gate lines GL1 to GLn extending in a second direction X2 and crossing the data lines DL1 to DLm, and a plurality of pixels PX arranged in areas defined by the data lines DL1 to DLm and the gate lines GL1 to GLn. The data lines DL1 to DLm are insulated from the gate lines GL1 to GLn.

Each pixel PX includes a switching transistor connected to a corresponding data line of the data lines DL1 to DLm and a corresponding gate line of the gate lines GL1 to GLn, and a liquid crystal capacitor and a storage capacitor, which are connected to the switching transistor.

The control board 120 includes a timing controller 121, a lens controller 122, a memory 123, a voltage generator 124, and a gamma voltage generator 125. The timing controller 121, the lens controller 122, the memory 123, the voltage generator 124, and the gamma voltage generator 125 are mounted on one control board 120. That is, all of the timing controller 121, the lens controller 122, the memory 123, the voltage generator 124, and the gamma voltage generator 125 are mounted together on the same, single control board 120.

The timing controller 121 receives an image signal(s) RGB and a control signal(s) CTRL. The control signal(s) CTRL may include, for example, any or all of a vertical synchronization signal, a horizontal synchronization signal, a main clock signal, a data enable signal, etc., and control the image signal(s) RGB.

The timing controller 121 processes the image signal(s) RGB based on an operation condition of the display panel 110, applies an image data signal DATA and a first control signal CONT1 to the data driver 140, and applies a second control signal CONT2 to the gate driver 130. The first control signal CONT1 may include, for example, a first start pulse signal, a clock signal, a polarity inversion signal, and/or a line latch signal, and the second control signal CONT2 may include, for example, a vertical synchronization start signal, an output enable signal, and/or a gate pulse signal.

The timing controller 121 may operate in a two-dimensional (2D) mode, a first 3D mode, or a second 3D mode in accordance with information included in the control signal(s) CTRL. Herein, the first 3D mode refers to an autostereoscopic 3D display mode and the second 3D mode refers to a stereoscopic 3D display mode. During the 2D mode and the second 3D mode, the lens panel 160 allows light exiting from the display panel 110 to be transmitted through the lens panel 160 without being changed. During the first 3D mode, the lens panel 160 is driven and refracts the light exiting from the display panel 110, thereby displaying a 3D image.

The timing controller 121 applies a third control signal CONT3 corresponding to the operation modes to the lens controller 122. For example, the third control signal CONT3 indicates to the lens controller 122 whether the timing controller 121 is operating in the 2D mode, the first 3D mode, or the second 3D mode, and the lens panel 160 operates according to the third control signal CONT3. The third control signal CONT3 may be referred to herein as a mode control signal.

The lens controller 122 applies a lens control signal LCS to the lens driver 150 in response to the third control signal CONT3. The lens controller 122 reads lens driving data LDATA from the memory 123, and applies the lens driving data LDATA to the lens driver 150. As described in further detail below, according to exemplary embodiments of the present invention, the lens driver 150 is driven in the first 3D mode, and is not driven in the 2D mode and the second 3D mode.

The memory 123 stores data including, for example, gamma compensation values used by the timing controller 121 and the lens driving data LDATA used by the lens controller 122. The memory 123 may be, for example, an electrically erasable programmable read-only memory (EE-PROM), however the memory 123 is not limited thereto.

The voltage generator 124 generates an analog driving voltage AVDD, a lens driving voltage AVDD_L, and a common voltage Vcom. The analog driving voltage AVDD is applied to the gamma voltage generator 125, the lens driving voltage AVDD_L is applied to the lens driver 150, and the common voltage Vcom is applied to the lens panel 160. The voltage generator 124 may generate various voltages used to drive the 3D image display apparatus 100 in addition to the analog driving voltage AVDD and the lens driving voltage AVDD_L. Since the analog driving voltage AVDD and the lens driving voltage AVDD_L are generated by one voltage generator 124, separate circuit blocks respectively generating the analog driving voltage AVDD and the lens driving voltage AVDD_L are not required. As a result, according to exemplary embodiments of the present invention, the size of the control board 120 may be reduced.

The gamma voltage generator 125 receives the analog driving voltage AVDD and generates gamma voltages VGMA1 to VGMA18. The gamma voltages VGMA1 to VGMA18 are applied to the data driver 140.

The timing controller 121, the lens controller 122, the memory 123, the voltage generator 124, and the gamma voltage generator 125 are mounted on one control board 120. That is, the timing controller 121, the lens controller 122, the memory 123, the voltage generator 124, and the gamma voltage generator 125 are mounted on the same, single control board 120. One memory 123 is shared by the timing controller 121 and the lens controller 122. As a result, according to exemplary embodiments of the present invention, a manufacturing process of the 3D image display apparatus 100 may be improved, and the size of the control board 120 may be decreased. In addition, when the timing controller 121 and the lens controller 122 are mounted on one control board 120, the transmission speed of signals applied to the lens controller 122 from the timing controller 121 may be improved, and a separate synchronization signal is not required.

According to exemplary embodiments of the present invention, since the lens driver 150 is not driven during the 2D mode and the second 3D mode, the voltage generator 124 does not generate the lens driving voltage AVDD_L during these modes. The timing controller 121 activates a first enable signal A3D_EN included in the third control signal CONT3 (e.g., sets the first enable signal A3D_EN to a high level) during the first 3D mode, and deactivates the first enable signal A3D_EN (e.g., sets the first enable signal A3D_EN to a low level) during the 2D mode and the second 3D mode. The voltage generator 124 generates the lens driving voltage AVDD_L and the common voltage Vcom when the first enable signal A3D_EN is activated, and does not generate the lens driving voltage AVDD_L and the common voltage Vcom when the first enable signal A3D_EN is deactivated. When the lens driving voltage AVDD_L and the common voltage Vcom are not generated, the lens driver 150 and the lens panel 160 are not driven. As a result, unnecessary power consumption may be prevented.

The gate driver 130 drives the gate lines GL1 to GLn in response to the second control signal CONT2 received from the timing controller 121. The gate driver 130 is configured to include circuits formed of, for example, oxide semiconductor, amorphous semiconductor, crystalline semiconductor, polycrystalline semiconductor, etc., and is disposed at one side of a front surface of the display panel 110. According to an exemplary embodiment, the gate driver 130 may be mounted on one side of the display panel 110 as a gate driver integrated circuit.

The data driver 140 includes data driving circuits 141 to 148. Each of the data driving circuits 141 to 148 may be implemented using, for example, a tape carrier package scheme or a chip-on-film scheme. One or more data driver integrated circuits may be mounted on each of the data driving circuits 141 to 148. In an exemplary embodiment, the data driving circuits 141 to 148 are electrically connected to the control board 120 through cables 221 to 228.

In response to receiving the image data signal DATA and the first control signal CONT1 from the timing controller 121, the data driver 140 outputs gray scale voltages through the cables 221 to 228 based on the gamma voltages VGMA1 to VGMA18, which are used to drive the data lines DL1 to DLm.

When a gate-on voltage is applied to the gate line by the gate driver 130, the switching transistors connected to the gate line are turned on. The data driver 140 applies the gray scale voltages corresponding to the image data signal DATA to the data lines DL1 to DLm. The gray scale voltages applied to the data lines DL1 to DLm are applied to corresponding liquid crystal capacitors and corresponding storage capacitors through the turned-on switching transistors. Accordingly, the image is displayed on the display panel 110.

The display panel 110 displays a 3D image or a 2D image. The display panel 110 displays a 3D image in the first 3D mode, and displays a 2D image in the 2D mode and in the second 3D mode (in the second 3D mode, a 3D effect may be perceived by the viewer via additional means such as, for example, via the viewer wearing shutter glasses). The lens panel 160 operates in accordance with whether the display panel 110 is displaying a 2D image or a 3D image. For example, when the display panel 110 displays a 2D image (e.g., during the 2D mode and the second 3D mode), the lens driver 150 does not drive the lens panel 160 since the lens driving voltage AVDD_L is not applied to the lens driver 150. In this case, image light (e.g., the light of the image) provided from the display panel 110 is transmitted through the lens panel 160 without being refracted, and a 2D image is provided by the display panel 110. The lens panel 160 may be, for example, a liquid crystal lens panel driven by the voltage. When the display panel 110 displays a 3D image (e.g., during the first 3D mode), the lens driver 150 generates a liquid crystal lens driving voltage (hereinafter referred to as a driving voltage) in response to receiving the lens driving data LDATA and the lens control signal LCS from the lens controller 122. The lens driver 150 applies the driving voltage to the lens panel 160.

When the display panel 110 displays a 3D image (e.g., during the first 3D mode), the lens panel 160 may serve as a Fresnel lens as a result of the driving voltage, and the image light provided from the display panel 110 is refracted by the lens panel 160, resulting in a 3D image being displayed by the display panel 110.

The lens driver 150 may include lens driving circuits 151 to 154. Lens driving integrated circuits 151_1 and 151_2 may be mounted on the lens driving circuit 151, lens driving integrated circuits 152_1 and 152_2 may be mounted on the lens driving circuit 152, lens driving integrated circuits 153_1 and 153_2 may be mounted on the lens driving circuit 153, and lens driving integrated circuits 154_1 and 154_2 may be mounted on the lens driving circuit 154. In the exemplary embodiment shown in FIG. 1, the lens driving circuits 151 and 152 are electrically connected to the control board 120 through cable 212, and the lens driving circuits 153 and 154 are electrically connected to the control board 120 through the cable 214.

The backlight unit 170 provides a light (e.g., a backlight light) to the display panel 110. The backlight unit 170 may be disposed at a rear side of the display panel 110 and face the display panel 110, or at a position adjacent to a long or short side of the display panel 110.

The timing controller 121 generates a backlight control signal BLC that controls the backlight unit 170 in accordance with the current operation mode of the display panel 110. The backlight unit 170 is turned on or off in response to the backlight control signal BLC. For example, when the operation mode is changed to the first 3D mode from the 2D mode or the second 3D mode, the timing controller 121 utilizes a predetermined amount of time to perform a rendering process, and the timing controller 121 generates the backlight control signal BLC to turn off the backlight unit 170.

Figures 3, 4:
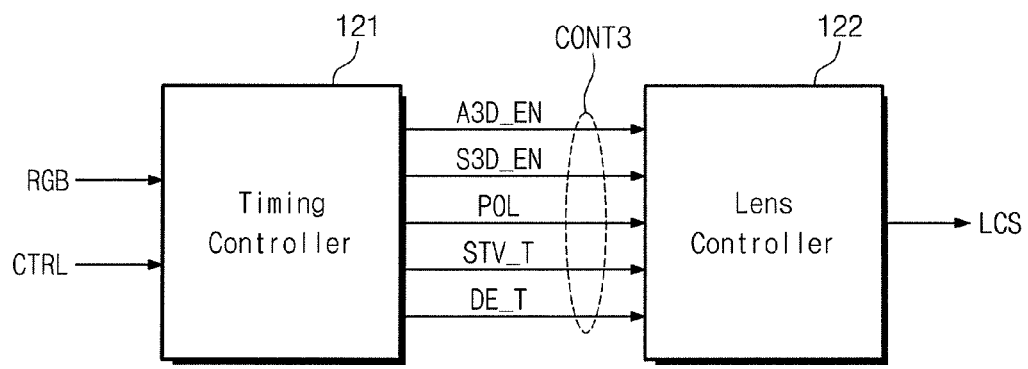
FIG. 3 is a block diagram showing signals applied to a lens controller from a timing controller shown in FIG. 2 according to an exemplary embodiment of the present invention.
FIG. 4 shows a look-up table stored in a memory shown in FIG. 2 according to an exemplary embodiment of the present invention.

FIG. 3 is a block diagram showing signals applied to the lens controller from the timing controller shown in FIG. 2 according to an exemplary embodiment of the present invention.

Referring to FIG. 3, the third control signal CONT3 applied to the lens controller 122 by the timing controller 121 includes the first enable signal A3D_EN, a second enable signal S3D_EN, a polarity control signal POL, a vertical synchronization start signal STV_T, and a data enable signal DE_T. The first enable signal A3D_EN is activated (e.g., set to a high level) in the autostereoscopic 3D display mode (e.g., in the first 3D mode). The second enable signal S3D_EN is activated (e.g., set to a high level) in the stereoscopic 3D mode (e.g., in the second 3D mode). The polarity control signal POL is used to control a polarity of the driving voltage applied to the lens panel 160 from the lens driver 150. The vertical start signal STV_T is a control signal used to indicate a start of one frame of the image signal(s) RGB. The data enable signal DE_T is a control signal used to indicate a start of a horizontal line of the image signal(s) RGB.

The lens controller 122 applies the lens control signal LCS to the lens driver 100 in response to the first enable signal A3D_EN, the second enable signal S3D_EN, the polarity control signal POL, the vertical synchronization start signal STV_T, and the data enable signal DE_T received from the timing controller 121.

As described above, since the timing controller 121 and the lens controller 122 are implemented using one control board 120, separate cables and connectors, which are typically required to transfer the first enable signal A3D_EN, the second enable signal S3D_EN, the polarity control signal POL, the vertical synchronization start signal STV_T, and the data enable signal DE_T, are not required in exemplary embodiments of the present invention. Reducing the number of cables and connectors in the 3D image display apparatus 100 may result in reducing the size of the 3D image display apparatus 100, and may improve the manufacturing process (e.g., by reducing cost) of the 3D image display apparatus 100.

FIG. 4 shows a look-up table stored in the memory 123 shown in FIG. 2 according to an exemplary embodiment of the present invention.

Referring to FIG. 4, the memory 123 stores a first gamma compensation value corresponding to the 2D mode, a second gamma compensation value corresponding to the first 3D mode (e.g., the autostereoscopic 3D display mode), and a third compensation value corresponding to the second 3D mode (e.g., the stereoscopic 3D display mode). In this case, the image signal(s) RGB have gamma values from 0 to 255. The image signal(s) RGB received from an external source (e.g., a source external to the control board 120) are compensated in consideration of characteristics of the human eye. In accordance with the operation mode of the 3D image display apparatus 100, the image signal(s) RGB are compensated to have optimized gamma compensation values.

The timing controller 121 (shown in FIG. 2) selects one of the first gamma compensation value, the second gamma compensation value, and the third gamma compensation value, which are stored in the memory 123. The timing controller 121 compensates for the image signal(s) RGB using the first gamma compensation value stored in the memory 123 when the operation mode is the 2D mode and outputs the compensated data signal DATA. The timing controller 121 compensates for the image signal(s) RGB using the second gamma compensation value stored in the memory 123 when the operation mode is the first 3D mode and outputs the compensated data signal DATA. The timing controller 121 compensates for the image signal(s) RGB using the third gamma compensation value stored in the memory 123 when the operation mode is the second 3D mode and outputs the compensated data signal DATA.

Figure 5:
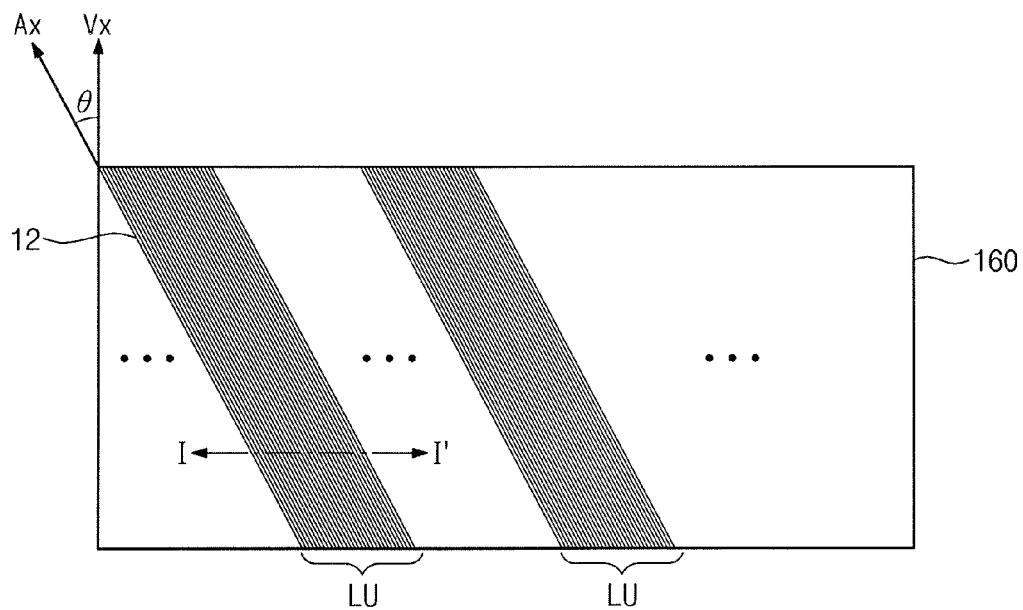
FIG. 5 is a plan view showing a lens panel shown in FIG. 2 according to an exemplary embodiment of the present invention.
Figure 6:
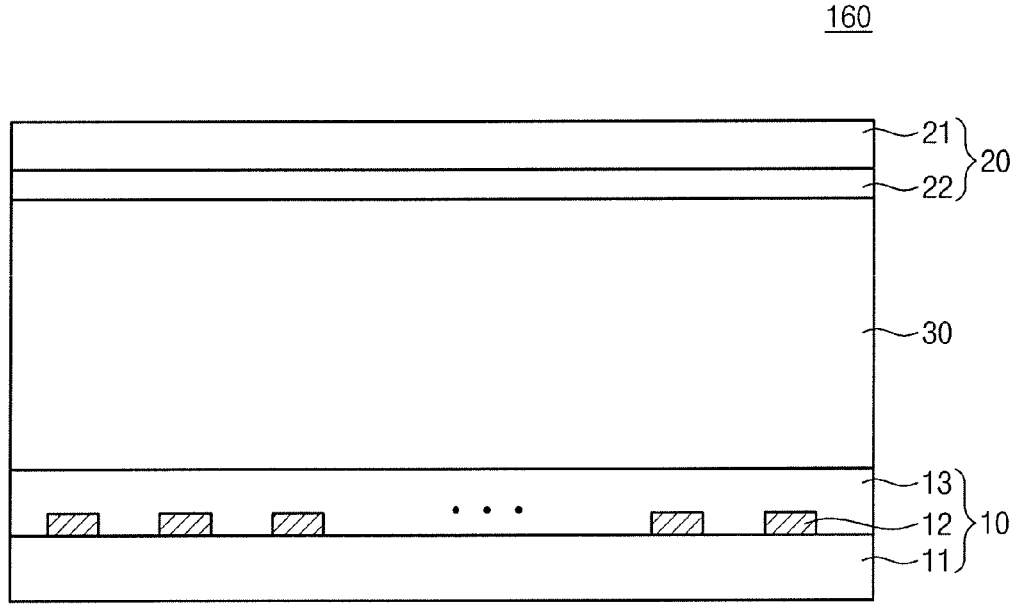
FIG. 6 is a cross-sectional view taken along line I-I' shown in FIG. 5 according to an exemplary embodiment of the present invention.

FIG. 5 is a plan view showing the lens panel shown in FIG. 2 according to an exemplary embodiment of the present invention. FIG. 6 is a cross-sectional view taken along line I-I' shown in FIG. 5 according to an exemplary embodiment of the present invention.

Referring to FIGS. 5 and 6, the lens panel 160 may include a plurality of lens units LU. Each of the lens units LU is disposed substantially in parallel to a lens axis Ax inclined at a predetermined angle θ with respect to a vertical axis Vx. Each of the lens driving integrated circuits 151_1, 151_2, 152_1, 152_2, 153_1, 153_2, 154_1, and 154_2 mounted on a corresponding lens driving circuit of the lens driving circuits 151 to 154 (shown in FIG. 1) may drive some lens units LU.

For example, each lens unit LU of the lens panel 160 may include a first substrate 10, a second substrate 20 facing the first substrate 10, and a liquid crystal layer 30 disposed between the first substrate 10 and the second substrate 20.

The first substrate 10 may include a first base substrate 11, a plurality of transparent electrodes 12 disposed on the first base substrate 11 and spaced apart from each other, and an insulating layer 13 disposed on the first base substrate 11 and covering the transparent electrodes 12.

The second substrate 20 may include a second base substrate 21 and a common electrode 22 disposed on the second base substrate 21.

When the 3D image display apparatus 100 operates in the first 3D mode, the liquid crystal lens driving voltage is applied to the transparent electrodes 12, and the common voltage Vcom is applied to the common electrode 22 from the voltage generator 124.

The transparent electrodes 12 are applied with continuously varying voltages and discontinuously varying voltages (e.g., 0 volts) between the continuously varying voltages as the liquid crystal lens driving voltage.

When the voltages are applied to the transparent electrodes 12 and the common electrode 22, liquid crystal molecules of the liquid crystal layer 30 are realigned by an electric field formed by the applied voltages, and the liquid crystal molecules have optical path distributions corresponding to those of the Fresnel lens. That is, each lens unit LU operates as the Fresnel lens.

For example, areas corresponding to the transparent electrodes 12 applied with the continuously varying voltages correspond to circular arcs of the Fresnel lens, and an area corresponding to the transparent electrodes applied with the discontinuously varying voltages corresponds to a boundary area between the circular arcs of the Fresnel lens.

Figure 7:
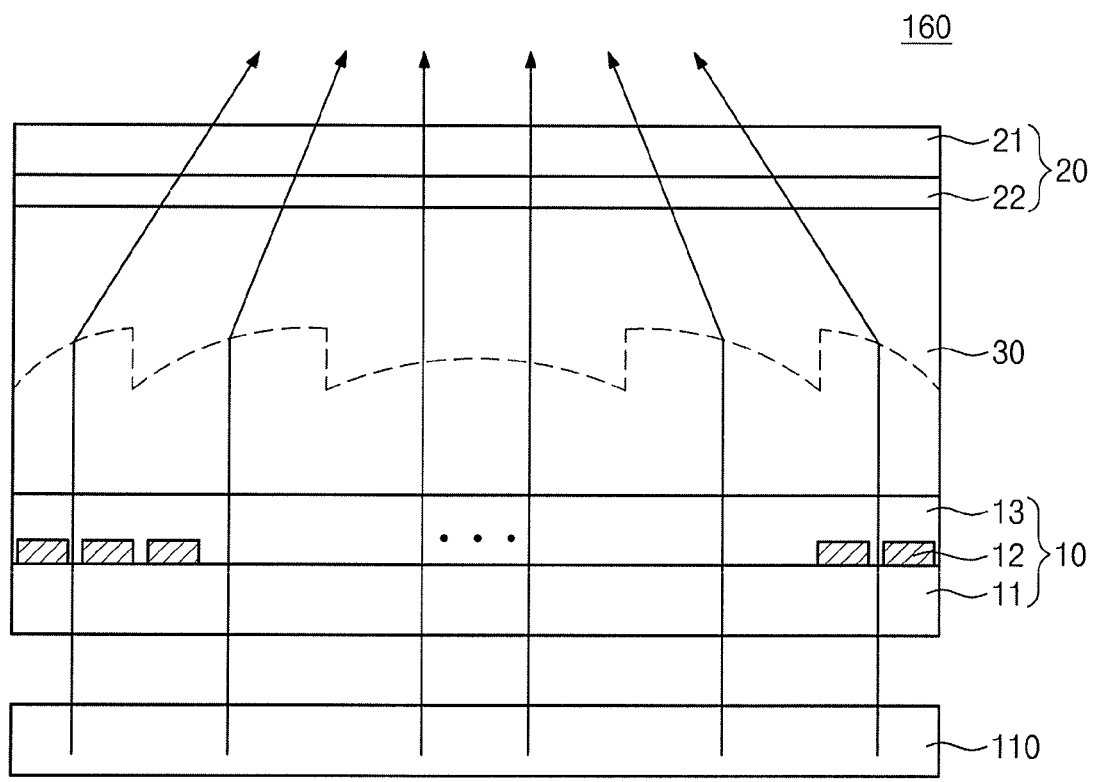
FIG. 7 is a view showing light refracted by a liquid crystal lens shown in FIG. 5 according to an exemplary embodiment of the present invention.

FIG. 7 is a view showing light refracted by the liquid crystal lens shown in FIG. 5 according to an exemplary embodiment of the present invention.

Referring to FIG. 7, when the 3D image display apparatus 100 displays a 3D image, the liquid crystal lens driving voltage is applied to the transparent electrodes 12 and the common voltage is applied to the common electrode 22.

The liquid crystal molecules of the liquid crystal layer 30 of the lens panel 160 are realigned by the electric field formed by the applied voltages, and the liquid crystal molecules have optical path distributions corresponding to those of the Fresnel lens as represented by a dotted line in FIG. 7.

The areas corresponding to the transparent electrodes 12 applied with the continuously varying voltages correspond to the circular arcs of the Fresnel lens, and an area corresponding to the transparent electrodes 12 applied with the discontinuously varying voltages corresponds to the boundary area between the circular arcs of the Fresnel lens.

The lens panel 160 operates as a Fresnel lens, and refracts the image light provided from the display panel 110. As a result, a 3D image is provided to the viewer.

According to exemplary embodiments of the present invention, the number of components and interfaces in the 3D image display apparatus 100 is reduced, resulting in the operation of the lens panel being simplified and the power consumption of the 3D image display apparatus 100 being reduced.

While the present invention has been particularly shown and described with reference to the exemplary embodiments thereof, it will be understood by those of ordinary skill in the art that various changes in form and detail may be made therein without departing from the spirit and scope of the present invention as defined by the following claims.

What is claimed is:

1. A three-dimensional (3D) image display apparatus, comprising:
a display panel configured to display an image, wherein the display panel comprises a plurality of gate lines, a plurality of data lines, and a plurality of pixels, each pixel being connected to a corresponding gate line of the gate lines and a corresponding data line of the data lines;
a data driver configured to drive the data lines;
a gate driver configured to drive the gate lines;
a lens panel configured to refract light of the image displayed by the display panel;
a lens driver configured to drive the lens panel;
a lens controller configured to control the lens driver; and
a timing controller configured to control the data driver, the gate driver, and the lens driver in response to an image signal and a control signal, wherein the lens controller and the timing controller are mounted on a same control board,
wherein the timing controller is configured to operate in a two-dimensional mode, a first three-dimensional mode corresponding to an autostereoscopic three-dimensional display mode, and a second three-dimensional mode corresponding to a stereoscopic three-dimensional display mode,
wherein the timing controller is configured to apply a mode control signal to the lens controller, wherein the mode control signal causes the lens panel to be driven during the first three-dimensional mode, and not to be driven during the two-dimensional mode and the second three-dimensional mode.

2. The three-dimensional image display apparatus of claim 1, wherein the timing controller is configured to apply a first control signal to the data driver and a second control signal to the gate driver.

3. The three-dimensional image display apparatus of claim 1, wherein the control board further comprises a memory configured to store a driving data used to drive the lens driver.

4. The three-dimensional image display apparatus of claim 3, wherein the memory is an electrically erasable programmable read-only memory (EEPROM).

5. The three-dimensional image display apparatus of claim 3, wherein the memory is configured to store a first gamma compensation value, a second gamma compensation value, and a third gamma compensation value.

6. The three-dimensional image display apparatus of claim 5, wherein the timing controller is configured to compensate for the image signal using the first gamma compensation value during the two-dimensional mode, compensate for the image signal using the second gamma compensation value during the first three-dimensional mode, and compensate for the image signal using the third gamma compensation value during the second three-dimensional mode.

7. The three-dimensional image display apparatus of claim 1, further comprising:
a voltage generator configured to generate an analog driving voltage and a lens driving voltage, wherein the lens driving voltage is applied to the lens driver; and
a gamma voltage generator configured to receive the analog driving voltage and generate a plurality of gamma voltages, wherein the gamma voltages are applied to the data driver.

8. The three-dimensional image display apparatus of claim 7, wherein the voltage generator and the gamma voltage generator are mounted on the control board.

9. The three-dimensional image display apparatus of claim 7, wherein the timing controller is configured to control the voltage generator such that the voltage generator does not to generate the lens driving voltage during the two-dimensional mode and the second three-dimensional mode.

10. The three-dimensional image display apparatus of claim 9, wherein the mode control signal comprises a first enable signal that indicates whether the timing controller is operating in the first three-dimensional mode, a second enable signal that indicates whether the timing controller is operating in the second three-dimensional mode, a polarity control signal that controls a polarity of a voltage used to drive the lens panel, a vertical synchronization signal that indicates a start of one frame of the image signal, and a data enable signal that indicates a start of one line of the image signal.

11. The three-dimensional image display apparatus of claim 10, wherein the voltage generator is configured to generate the lens driving voltage in response to the first enable signal.

12. The three-dimensional image display apparatus of claim 1, further comprising a backlight unit configured to supply a backlight light to the display panel, wherein the timing controller is configured to turn off the backlight unit upon the two-dimensional mode or the second three-dimensional mode changing to the first three-dimensional mode.

13. The three-dimensional image display apparatus of claim 1, wherein the lens driver comprises a plurality of driving integrated circuits configured to drive the lens panel.

14. The three-dimensional image display apparatus of claim 1, wherein the display panel is a liquid crystal display panel.

15. The three-dimensional image display apparatus of claim 1, wherein the lens panel operates as a Fresnel lens.

16. A control board for a three-dimensional image display apparatus, comprising:
a timing controller configured to operate in a two-dimensional mode, a first three-dimensional mode corresponding to an autostereoscopic three-dimensional display mode, and a second three-dimensional mode corresponding to a stereoscopic three-dimensional display mode; and a lens controller configured to control a lens driver of the three-dimensional image display apparatus, wherein the lens driver is configured to drive a lens panel of the three-dimensional image display apparatus, wherein the timing controller is configured to apply a mode control signal to the lens controller, wherein the mode control signal causes the lens panel to be driven during the first three-dimensional mode, and not to be driven during the two-dimensional mode and the second three-dimensional mode.

17. The control board of claim 16, further comprising:

a voltage generator configured to generate an analog driving voltage and a lens driving voltage, wherein the lens driving voltage is applied to the lens driver, wherein the timing controller is configured to control the voltage generator such that the voltage generator does not to generate the lens driving voltage during the two-dimensional mode and the second three-dimensional mode.

* * * * *